(12) United States Patent
Pritchard

(10) Patent No.: US 9,366,334 B2
(45) Date of Patent: Jun. 14, 2016

(54) LUBRICATION SYSTEM AND TRANSFER CASE INCORPORATING THE SAME

(71) Applicant: BorgWarner Inc., Auburn Hills, MI (US)

(72) Inventor: Larry A. Pritchard, Macomb, MI (US)

(73) Assignee: BORGWARNER INC., Auburn Hills, MI (US)

( * ) Notice: Subject to any disclaimer, the term of this patent is extended or adjusted under 35 U.S.C. 154(b) by 111 days.

(21) Appl. No.: 14/270,463

(22) Filed: May 6, 2014

(65) Prior Publication Data

US 2015/0323059 A1 Nov. 12, 2015

(51) Int. Cl.
| | |
|---|---|
| *F16H 57/05* | (2006.01) |
| *F16H 7/06* | (2006.01) |
| *F16H 57/04* | (2010.01) |

(52) U.S. Cl.
CPC ............... *F16H 57/05* (2013.01); *F16H 7/06* (2013.01); *F16H 57/046* (2013.01); *F16H 57/0436* (2013.01); *F16H 57/0453* (2013.01)

(58) Field of Classification Search
CPC . F16H 57/05; F16H 57/0436; F16H 57/0453; F16H 57/046; F16H 7/06
USPC ........................................................ 184/6.12
See application file for complete search history.

(56) References Cited

U.S. PATENT DOCUMENTS

| | | | | | |
|---|---|---|---|---|---|
| 1,771,835 | A | * | 7/1930 | Bartlett | F16H 57/05 184/13.1 |
| 1,960,693 | A | * | 5/1934 | Bryant | F16H 57/0421 184/13.1 |
| 1,971,311 | A | * | 8/1934 | Chapman | F16H 57/05 184/15.1 |
| 1,984,148 | A | * | 12/1934 | Morrish | F16H 57/05 184/15.1 |
| 3,012,632 | A | * | 12/1961 | Bradley | B62J 31/00 184/15.1 |
| 4,009,764 | A | * | 3/1977 | Hafner | F16N 7/02 184/15.2 |

(Continued)

*Primary Examiner* — William A Rivera
*Assistant Examiner* — Michael Riegelman
(74) *Attorney, Agent, or Firm* — Howard & Howard Attorneys PLLC

(57) ABSTRACT

The present invention relates to a transfer case (16) lubrication system (42) that includes a housing (44) defining a chamber and having a lower portion (58). A partition (46) extends from the lower portion (58) and is disposed in the chamber so as to define a reservoir for oil, adjacent to the partition (46) and spaced from the chamber. First and second sprocket (50)s are supported in the chamber, with the first sprocket (48) being spaced from the reservoir. The system also includes a pump assembly (52) having an oil pump (78), a pickup (80) in fluid communication with the pump and at least partially disposed in the reservoir, and a spray bar (82) in fluid communication with the pump for directing oil from the reservoir to a predetermined location within the chamber. A chain (54) connects the sprockets and is spaced from the partition (46) so as to generate a windage force for transferring oil from the chamber to the reservoir in operation.

20 Claims, 2 Drawing Sheets

(56) References Cited

U.S. PATENT DOCUMENTS

| | | | |
|---|---|---|---|
| 4,699,249 A | 10/1987 | Fujiura et al. | |
| 5,033,989 A * | 7/1991 | Shimaguchi | F16H 57/0421 184/11.5 |
| 5,662,188 A | 9/1997 | Ito et al. | |
| 5,888,163 A | 3/1999 | Shaffer et al. | |
| 5,934,411 A * | 8/1999 | Murano | F16N 13/06 184/11.5 |
| 6,579,208 B2 | 6/2003 | Oliveira et al. | |
| 6,582,331 B1 | 6/2003 | Baxter, Jr. | |
| 6,688,434 B2 * | 2/2004 | Johnson | B65G 45/02 184/15.3 |
| 6,971,503 B2 * | 12/2005 | Thompson | B65G 45/24 198/494 |
| 7,743,888 B2 | 6/2010 | Allen et al. | |
| 7,766,126 B2 * | 8/2010 | Berger | F16H 57/0447 137/468 |
| 8,043,184 B2 | 10/2011 | Boddy | |
| 8,152,674 B2 | 4/2012 | Hayes et al. | |
| 8,376,906 B2 | 2/2013 | Koenig et al. | |
| 8,567,565 B2 | 10/2013 | Chippendale | |
| 9,028,351 B1 * | 5/2015 | Rodriguez | B62J 31/00 474/91 |
| 2008/0026893 A1 * | 1/2008 | Yamamoto | F16H 7/06 474/91 |
| 2010/0101607 A1 * | 4/2010 | Feldstein | B08B 3/022 134/15 |
| 2012/0061184 A1 * | 3/2012 | Craft | F04C 2/102 184/6.12 |
| 2013/0190114 A1 * | 7/2013 | Neumeister | F16H 57/0409 474/93 |
| 2014/0094333 A1 * | 4/2014 | Ebner | F16H 57/05 474/91 |
| 2015/0152955 A1 * | 6/2015 | Feichtner | F16H 57/05 474/86 |

* cited by examiner

LUBRICATION SYSTEM AND TRANSFER CASE INCORPORATING THE SAME

BACKGROUND OF INVENTION

1. Field of Invention

The present invention relates generally to automotive transfer cases and, more specifically, to a lubrication system for a transfer case.

2. Description of the Related Art

Conventional four-wheel-drive systems for automobiles known in the art typically include an internal combustion engine that outputs rotational torque to a transmission which, in turn, adjusts the speed and torque. The transmission subsequently translates adjusted rotational torque to a transfer case. The transfer case is configured to selectively translate rotational torque to a rear differential in rear-wheel-drive mode, or to both the rear differential and a front differential in four-wheel-drive mode. To that end, transfer cases typically include a housing supporting a series of shafts, gears, chains, and linkages which cooperate to effect selectable translation of rotational torque to the differentials. The transfer case is typically lubricated with oil and includes a pump assembly configured to transfer oil to the various shafts, gears, chains, and linkages in operation.

The pump assembly typically includes an oil pump in rotational communication with and driven by one of the shafts, gears, or chains, which displaces oil from a reservoir chamber to the various components of the transfer case. To that end, the pump assembly also typically includes a pickup in fluid communication with oil disposed in the reservoir.

Each of the components of a transfer case of the type described above must cooperate to effectively selectively translate rotation from the transmission to the differentials. In addition, each of the components must be designed not only to facilitate improved performance and efficiency, but also so as to reduce the cost and complexity of manufacturing the transfer case. While transfer case lubrication systems known in the related art have generally performed well for their intended purpose, there remains a need in the art for a transfer case lubrication system that has superior operational characteristics, and, at the same time, reduces the cost and complexity of manufacturing the components of the transfer case.

SUMMARY OF THE INVENTION

The present invention overcomes the disadvantages in the related art in a lubrication system for use in a transfer case of motor vehicle drivetrain. The lubrication system includes a housing defining an inner chamber and having a lower portion. A partition extends from the lower portion of the housing and is disposed in the inner chamber so as to define a reservoir chamber for oil adjacent to the partition and spaced from the inner chamber. A first sprocket is rotatably supported in the inner chamber and is spaced from the reservoir chamber, and a second sprocket is rotatably supported in the inner chamber. The lubrication system also includes a pump assembly. The pump assembly has an oil pump, a pickup in fluid communication with the oil pump and at least partially disposed in the reservoir chamber, and a spray bar in fluid communication with the oil pump for directing oil pumped from the reservoir chamber to a predetermined location within the inner chamber. The lubrication system also includes an endless chain connecting the first sprocket to the second sprocket. The chain is spaced from the partition so as to generate a windage force for transferring oil from the inner chamber to the reservoir chamber in operation.

In addition, the present invention is directed toward a transfer case for transmitting rotational torque from a transmission to differentials of a motor vehicle. The transfer case includes a housing defining an inner chamber and having a lower portion. A partition extends from the lower portion of the housing and is disposed in the inner chamber so as to define a reservoir chamber for oil adjacent to the partition and spaced from the inner chamber. A first sprocket is rotatably supported in the inner chamber and is spaced from the reservoir chamber, and a second sprocket is rotatably supported in the inner chamber. The transfer case also includes a pump assembly. The pump assembly has an oil pump, a pickup in fluid communication with the oil pump and at least partially disposed in the reservoir chamber, and a spray bar in fluid communication with the oil pump for directing oil pumped from the reservoir chamber to a predetermined location within the inner chamber. The transfer case also includes an endless chain connecting the first sprocket to the second sprocket. The chain is spaced from the partition so as to generate a windage force for transferring oil from the inner chamber to the reservoir chamber in operation.

In this way, lubrication system of the present invention significantly minimizes parasitic losses in the transfer case in operation. Moreover, the lubrication system reduces the cost and complexity of manufacturing transfer cases that have superior operational characteristics, such as high efficiency, improved packaging and ground clearance, and improved life.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
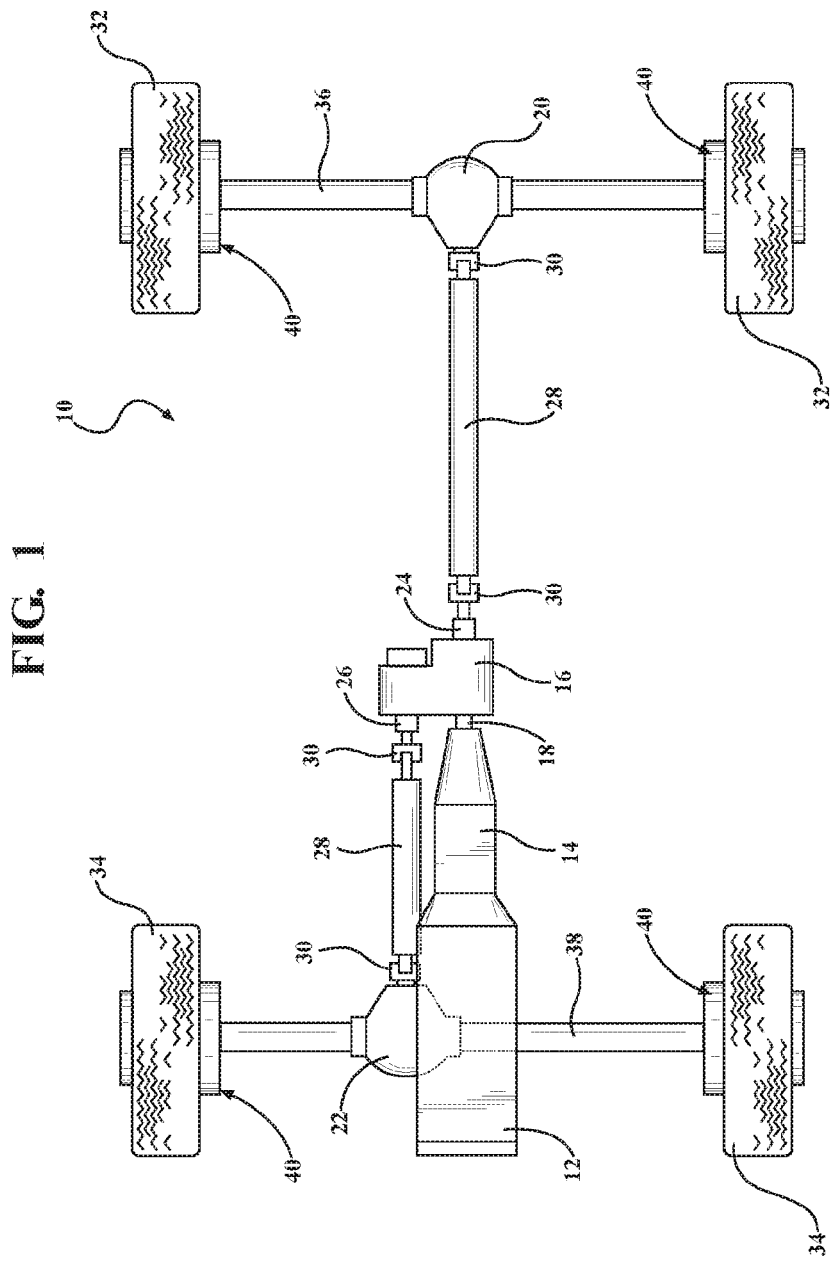
FIG. 1 is a schematic plan view of the drivetrain of a four-wheel-drive automobile, including a transfer case, according to one embodiment of the present invention.

Referring now to the figures, where like numerals are used to designate like structure, a portion of a drivetrain of an automobile is schematically illustrated at 10 in FIG. 1. The drivetrain 10 includes an internal combustion engine 12, a transmission 14, and a transfer case 16. The engine 12 produces rotational torque and is in rotational communication with the transmission 14. The transmission 14 adjusts the rotational speed and torque from the engine and is configured to output the adjusted rotation as discussed in greater detail below. Those having ordinary skill in the art will appreciate that transmission 14 can be designed in several different ways and, as such, can be in rotational communication with the engine 12 in any suitable way depending on the application. By way of non-limiting example, the transmission 14 could include a gear set (not shown, but generally known in the art) that is either manually or automatically actuated, or the transmission 14 could be continuously variable. Moreover, while FIG. 1 shows the engine 12 and transmission 14 operatively attached to one another, those having ordinary skill in the art will appreciate that the transmission 14 could spaced from the engine 12, so as to improve weight distribution of the drivetrain 10, without departing from the scope of the present invention.

The transmission 14 is in rotational communication with the transfer case 16 and translates the adjusted rotational torque thereto. In the representative embodiment illustrated herein, the transfer case 16 is situated in-line with the transmission 14 and is in rotational communication therewith via a transmission output shaft 18. However, those having ordinary skill in the an will appreciate that the transfer case 16 and transmission 14 could be in rotational communication with each other in other ways. Specifically, it will be appreciated that the transmission 14 and transfer case 16 could be offset from one another and could be in rotational communication via an intermediate shaft having one or more universal joints (not shown, but generally known in the art), thereby enabling additional flexibility with respect to weight distribution and packaging of the drivetrain 10.

The transfer case 16 is typically configured to selectively translate rotational torque to a rear differential 20 in rear-wheel-drive mode, or to both the rear differential 20 and a front differential 22 in four-wheel-drive mode. Those having ordinary skill in the art will appreciate that the transfer case 16 could be selectively switched from rear-wheel-drive mode to four-wheel-drive mode in a number of different ways, such as with mechanical levers or electronically-controlled actuators, without departing from the scope of the present invention. The transfer case 16 includes a rear output 24 and a front output 26 in rotational communication with the rear differential 20 and the front differential 22, respectively. A pair of driveshafts 28 having one or more universal joints 30 connect the outputs 24, 26 of the transfer case 16 to the differentials 20, 22 so as to translate rotational torque thereto. The differentials 20, 22 are each in rotational communication with a respective pair of wheels and tires 32, 34 and translate rotational torque to the wheels and tires 32, 34 so as to drive the automobile in operation. In the representative embodiment illustrated herein, the differentials 20, 22 are carried by respective axle assemblies 36, 38 having hubs, generally indicated at 40, to which the wheels and tires 32, 34 are mounted. However, those having ordinary skill in the art will appreciate that there are a number of different ways that the differentials 20, 22 could translate rotational torque to the wheels and tires 32, 34, depending on the application.

Figure 2:
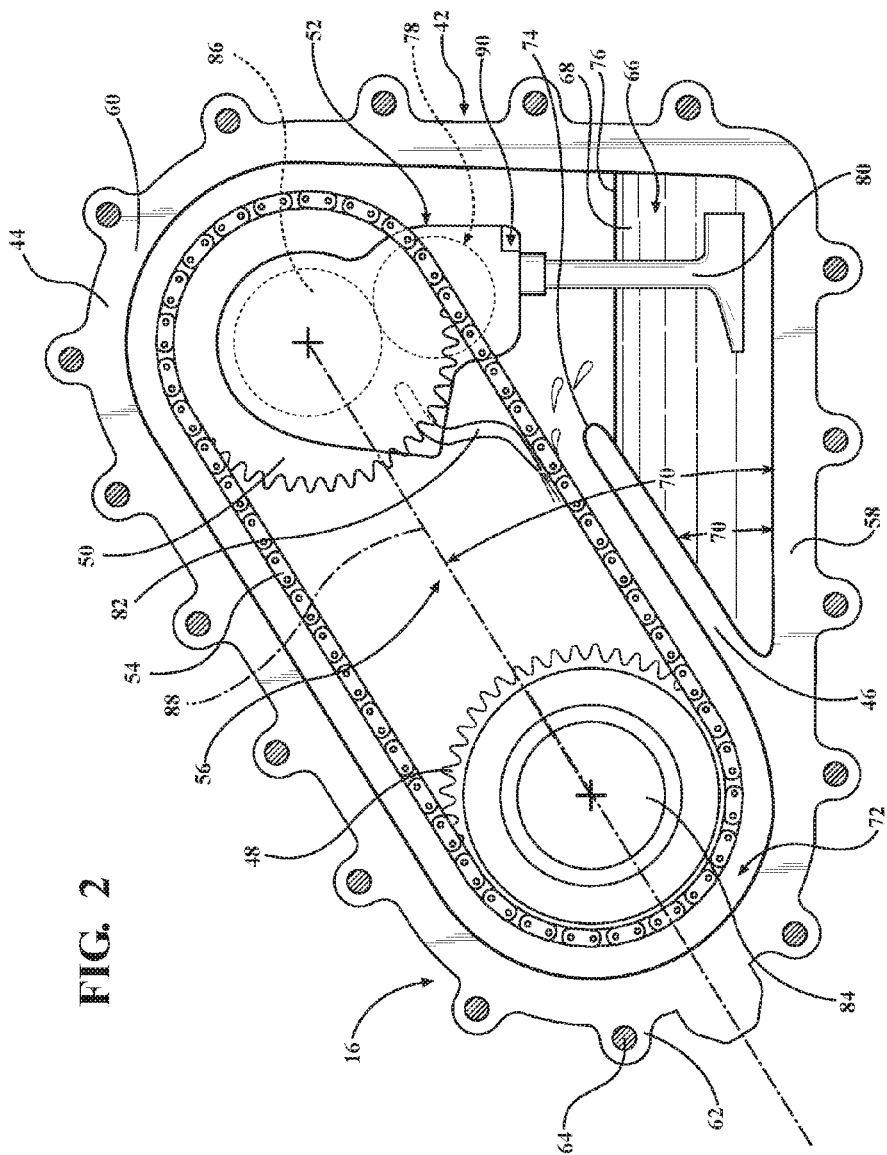
FIG. 2 is a cross-sectional view of a transfer case lubrication system, according to one embodiment of the present invention.

Referring now to FIG. 2, a cross-sectional view of a transfer case 16 of the type described above is shown. More specifically, FIG. 2 illustrates a lubrication system, generally indicated at 42, according to one embodiment of the present invention, of the transfer case 16. The lubrication system 42 includes a housing 44, a partition 46, a pair of sprockets 48, 50, a pump assembly 52, and an endless chain 54. Each of these components will be described in greater detail below.

The housing 44 of the transfer case 16 defines an inner chamber 56 in which the lubrication system 42 is generally disposed. The housing 44 has a lower portion 58 which merges with an upper portion 60. In the representative example illustrated herein, the lower portion 58 and upper portion 60 include a plurality of integrated bosses 62 with connecting bolts 64 disposed therein. Those having ordinary skill in the art will appreciate that the bosses 62 and bolts 64 cooperate with the housing 44 of the transfer case 16 so as to secure various discrete portions of the housing 44 together (not shown in detail, but generally known in the art). However, it will be appreciated that the housing 44 could be secured in any suitable fashion, and that the bosses 62 and bolts 64 could be configured differently, or omitted entirely, without departing from the scope of the present invention.

The partition 46 extends from the lower portion 58 of the housing 44 and is disposed in the inner chamber 56 so as to define a reservoir chamber 66 for oil 68. Thus, the reservoir chamber 66 and oil 68 are spaced from the inner chamber 56 and are adjacent to the partition 46. The oil 68, reservoir chamber 66, and inner chamber 56 cooperate with the sprockets 48, 50, pump assembly 52, and chain 54 as described in greater detail below.

The first sprocket 48 is rotatably supported in the inner chamber 56 of the housing 44 and is spaced from the reservoir chamber 66. Similarly, the second sprocket 50 is rotatably supported in the inner chamber 56 of the housing 44. The sprockets 48, 50 are connected by the endless chain 54, which is spaced from the partition 46 so as to generate a windage force for transferring oil 68 from the inner chamber 56 to the reservoir chamber 66 in operation. As will be appreciated from the subsequent description of the pump assembly 52 that follows, because first sprocket 48 is spaced from the reservoir chamber 66 and, thus, is not submerged in oil 68, aeration of the oil 68 is significantly reduced and parasitic losses are decreased.

In one embodiment, the partition 46 defines an acute angle 70 with the lower portion 58 of the housing 44 adjacent to the reservoir chamber 66. However, those having ordinary skill in the art will appreciate that the partition 46 could be configured in any suitable way with respect to the lower portion 58 of the housing 44 without departing from the scope of the present invention. Moreover, in one embodiment, the partition 46 is substantially parallel to at least a portion of the chain 54 disposed between the first sprocket 48 and the second sprocket 50. It will be appreciated, however, that the chain 54 may flex in operation and may stretch over time. Thus, the portion of the chain 54 discussed above could be in any suitable place disposed between the sprockets 48, 50, defined in any suitable way, during any sufficient operation point, so as to be substantially parallel to the partition 46 as discussed above, without departing from the scope of the present invention.

In one embodiment, the inner chamber 56 of the housing 44 includes a curved pocket portion, generally indicated at 72, adjacent to the first sprocket 48. Moreover, as shown in FIG. 2, the housing 44 merges with the partition 46 adjacent to the curved pocket portion 72. However, those having ordinary skill in the art will appreciate that the partition 46 could be formed or configured differently, and could be spaced from or otherwise separated from the housing 44 sufficient to define the reservoir chamber 66, as discussed above, without departing from the scope of the present invention. Further, as shown in FIG. 2, the housing 44 is spaced at a substantially constant distance from the endless chain 54 along the curved pocket portion 72 of the inner chamber 56. However, as discussed above, the chain 54 may stretch or otherwise flex in operation and, as such, the curved pocket portion 72 and the inner chamber 56 could be spaced differently with respect to the chain 54 or otherwise configured so as to accommodate the chain 54, without departing from the scope of the present invention. Specifically, it is conceivable that one of the inner chamber 56 and the curved pocket portion 72 could include an elliptical profile (not shown, but generally known in the art) configured to maintain a predetermined distance with respect to the chain 54 in operation.

In one embodiment, the partition 46 merges with the lower portion 58 of the housing 44 and extends to a terminal edge 74. The terminal edge 74 is disposed in the inner chamber 56 of the housing 44 and is spaced further from the lower portion 58 of the housing 44 than a maximum oil level 76 (see FIG. 2) of the reservoir chamber 66. As shown, the terminal edge 74 of the partition 46 has a curved profile. However, those having ordinary skill in the art will appreciate that the terminal edge 74 could have any suitable profile sufficient to facilitate displacement of oil into the reservoir chamber 66 without departing from the scope of the present invention.

As discussed above, the lubrication system 42 of the present invention includes a pump assembly 52. The pump assembly 52 includes an oil pump 78, a pickup 80 in fluid communication with the oil pump 78 and at least partially disposed in the reservoir chamber 66, and a spray bar 82. It will be appreciated that the oil pump 78 displaces oil 68 from the reservoir chamber 66 and supplies it throughout the transfer case 16 so as to ensure proper operation of the various components discussed above. Further, the spray bar 82 is in fluid communication with the oil pump 78 and directs oil 68 pumped from the reservoir chamber 66 to a predetermined location within the inner chamber 56. Advantageously, the spray bar 82 directs oil 68 to one of the first sprocket 48 and the endless chain 54. However, those having ordinary skill in the art will appreciate that the spray bar 82 could direct oil 68 to any suitable location within the inner chamber 56 without departing from the scope of the present invention.

In one embodiment, the first sprocket 48 may be rotatably supported by and concentrically aligned with a first shaft 84, wherein the oil pump 78 is spaced from and in rotational communication with the shaft 84. It will be appreciated that the first shaft 84 could be any suitable shaft in the transfer case 16 sufficient to be disposed in rotational communication with and the oil pump 78. Moreover, the transfer case 16 may also include a second shaft 86 spaced from the first shaft 84, with the second sprocket 50 rotatably supported by and concentrically aligned with the second shaft 86. It will be appreciated that the first and second shafts 84, 86 may define the outputs 24, 26 of the transfer case 16, as discussed above. However, those having ordinary skill in the art will appreciate that the first and second shafts 84, 86 could be configured differently, such as to intermediately communicate rotationally with other components of the transfer case 16, without departing from the scope of the present invention.

As shown in FIG. 2, the oil pump 78 is spaced from the first shaft 84 and is driven "off-axis" with respect to both of the shafts 84, 86, whereby the oil pump 78 is not disposed axially-concentric with either of the shafts 84, 86. In the embodiment illustrated in FIG. 2, the oil pump 78 is driven, off-axis, by the second shaft 86, whereby respective rotational centers of the oil pump 78 and second shaft 86 are spaced from each other. Those having ordinary skill in the art will appreciate that the oil pump 78 being driven off-axis in this way significantly improves the packaging of the transfer case 16, as the oil pump 78 would otherwise require additional length with respect to the shafts 84, 86 if driven on-axis.

In one embodiment, the oil pump 78 is a gerotor pump and the pump assembly 52 further includes a bypass valve 90 for regulating the oil pump 78 based on flow. However, those having ordinary skill in the art will appreciate that the oil pump 78 could be of any suitable design, regulated in any suitable way, without departing from the scope of the present invention.

As shown in FIG. 2, in one embodiment, the first and second shafts 84, 86 define an alignment line 88 through their respective rotational centers. The alignment line 88 is substantially parallel to the partition 46. Thus, it will be appreciated that the alignment line 88, like the partition 46, may also define the acute angle 70 with respect to the lower portion 58 of the housing 44 of the transfer case 16, as discussed above.

In this way, it will be appreciated that lubrication system 42 and transfer case 16 of the present invention significantly minimizes parasitic losses in operation. Specifically, it will be appreciated that the orientation of the sprockets 48, 50, the pump assembly 52, and the reservoir chamber 66 reduces aeration of the oil 68 in that the first sprocket 48 need not be submerged in oil 68 to be properly lubricated, and that the windage force discussed above simultaneously prevents accumulation of oil 68 and displaces oil 68 to the reservoir chamber 66. Moreover, it will be appreciated that the present invention reduces the cost and complexity of manufacturing a transfer case 16 that has have superior operational characteristics, such as high efficiency, improved packaging and ground clearance, and improved performance and component life.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A lubrication system (42) for use in a transfer case (16) of motor vehicle drivetrain (10), said lubrication system (42) comprising:
   a housing (44) defining an inner chamber (56) and having a lower portion (58);
   a partition (46) extending from said lower portion (58) of said housing (44) and disposed in said inner chamber (56) so as to define a reservoir chamber (66) for oil adjacent to said partition (46) and spaced from said inner chamber (56);
   a first sprocket (48) rotatably supported in said inner chamber (56) and spaced from said reservoir chamber (66);
   a second sprocket (50) rotatably supported in said inner chamber (56);
   a pump assembly (52) having:
      an oil pump (78),
      a pickup (80) in fluid communication with said oil pump (78) and at least partially disposed in said reservoir chamber (66),
      a spray bar (82) in fluid communication with said oil pump (78) for directing oil pumped (78) from said reservoir chamber (66) to a predetermined location within said inner chamber (56); and
   an endless chain (54) connecting said first sprocket (48) to said second sprocket (50), said chain (54) being spaced from said partition (46) so as to generate a windage force for transferring oil from said inner chamber (56) to said reservoir chamber (66) in operation; and wherein said partition (46) extends to a terminal edge (74) disposed in said inner chamber (56) of said housing (44), said terminal edge (74) being spaced closer to said second sprocket (50) and said oil pump (78) than to said first sprocket (48).

2. The lubrication system (42) as set forth in claim 1, wherein said partition (46) defines an acute angle (70) with said lower portion (58) of said housing (44) adjacent to said reservoir chamber (66).

3. The lubrication system (42) as set forth in claim 1, wherein said partition (46) is substantially parallel to at least a portion of said endless chain (54) disposed between said first sprocket (48) and said second sprocket (50).

4. The lubrication system (42) as set forth in claim 1, wherein said inner chamber (56) of said housing (44) includes a curved pocket portion (72) adjacent to said first sprocket (48).

5. The lubrication system (42) as set forth in claim 4, wherein said housing (44) merges with said partition (46) adjacent to said curved pocket portion (72).

6. The lubrication system (42) as set forth in claim 4, wherein said housing (44) is spaced at a substantially constant distance from said endless chain (54) along said curved pocket portion (72) of said inner chamber (56).

7. The lubrication system (42) as set forth in claim 1, wherein said partition (46) merges with said lower portion (58) of said housing, with said terminal edge (74) spaced further from said lower portion (58) of said housing (44) than a maximum oil level of said reservoir chamber (66).

8. The lubrication system (42) as set forth in claim 1, wherein said first sprocket (48) is rotatably supported by and concentrically aligned with a shaft (84), said oil pump (78) spaced from and in rotational communication with said shaft (84).

9. The lubrication system (42) as set forth in claim 8, wherein said oil pump (78) is a gerotor pump, and wherein said pump assembly (52) further includes a bypass valve (90) for regulating said oil pump (78) based on flow.

10. The lubrication system (42) as set forth in claim 1, wherein said spray bar (82) directs oil to one of said first sprocket (48) and said endless chain (54).

11. A transfer case (16) for transmitting rotational torque from a transmission to differentials of a motor vehicle, said transfer case (16) comprising:
- a housing (44) defining an inner chamber (56) and having a lower portion (58);
- a partition (46) extending from said lower portion (58) of said housing (44) and disposed in said inner chamber (56) so as to define a reservoir chamber (66) for oil adjacent to said partition (46) and spaced from said inner chamber (56);
- a first sprocket (48) rotatably supported in said inner chamber (56), and spaced from said reservoir chamber (66);
- a second sprocket (50) rotatably supported in said inner chamber (56);
- a pump assembly (52) having:
  - an oil pump (78),
  - a pickup (80) in fluid communication with said oil pump (78) and at least partially disposed in said reservoir chamber (66),
  - a spray bar (82) in fluid communication with said oil pump (78) for directing oil pumped from said reservoir chamber (66) to a predetermined location within said inner chamber (56); and
- an endless chain (54) connecting said first sprocket (48) to said second sprocket (50), said chain (54) being spaced from said partition (46) so as to generate a windage force for transferring oil from said inner chamber (56) to said reservoir chamber (66) in operation; and wherein said partition (46) extends to a terminal edge (74) disposed in said inner chamber (56) of said housing (44), said terminal edge (74) being spaced closer to said second sprocket (50) and oil pump (78) than to said first sprocket (48).

12. The transfer case (16) as set forth in claim 11, wherein said partition (46) defines an acute angle (70) with said lower portion (58) of said housing (44) adjacent to said reservoir chamber (66).

13. The transfer case (16) as set forth in claim 11, wherein said partition (46) is substantially parallel to at least a portion of said endless chain (54) disposed between said first sprocket (48) and said second sprocket (50).

14. The transfer case (16) as set forth in claim 11, wherein said inner chamber (56) of said housing (44) includes a curved pocket portion (72) adjacent to said first sprocket (48).

15. The transfer case (16) as set forth in claim 14, wherein said housing (44) merges with said partition (46) adjacent to said curved pocket portion (72).

16. The transfer case (16) as set forth in claim 14, wherein said housing (44) is spaced at a substantially constant distance from said endless chain (54) along said curved pocket portion (72) of said inner chamber (56).

17. The transfer case (16) as set forth in claim 11, wherein said partition (46) merges with said lower portion (58) of said housing, with said terminal edge (74) spaced further from said lower portion (58) of said housing (44) than a maximum oil level of said reservoir chamber (66).

18. The transfer case (16) (42) as set forth in claim 11, wherein said first sprocket (48) is rotatably supported by and concentrically aligned with a shaft (84), said oil pump (78) spaced from and in rotational communication with said shaft (84).

19. The transfer case (16) (42) as set forth in claim 18, wherein said oil pump (78) is a gerotor pump, and wherein said pump assembly (52) further includes a bypass valve (90) for regulating said oil pump (78) based on flow.

20. The transfer case (16) as set forth in claim 11, wherein said spray bar (82) directs oil to one of said first sprocket (48) and said endless chain (54).

* * * * *